(12) United States Patent
Lee et al.

(10) Patent No.: US 9,995,576 B2
(45) Date of Patent: Jun. 12, 2018

(54) DISTANCE MEASURING DEVICE AND METHOD THEREOF

(71) Applicant: LG ELECTRONICS INC., Seoul (KR)

(72) Inventors: Jejong Lee, Seoul (KR); Sungjin Cho, Seoul (KR); Gyeongeon Lee, Seoul (KR); Sunghoon Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 604 days.

(21) Appl. No.: 14/572,488

(22) Filed: Dec. 16, 2014

(65) Prior Publication Data
US 2015/0168541 A1    Jun. 18, 2015

(30) Foreign Application Priority Data

Dec. 18, 2013   (KR) .................. 10-2013-0158205
Jan. 2, 2014    (KR) .................. 10-2014-0000086

(51) Int. Cl.
*G01C 3/06*    (2006.01)
*G01S 17/08*   (2006.01)
(Continued)

(52) U.S. Cl.
CPC .............. *G01C 3/06* (2013.01); *G01S 7/4808* (2013.01); *G01S 7/497* (2013.01); *G01S 17/08* (2013.01);
(Continued)

(58) Field of Classification Search
CPC .......... G01S 17/08; G01S 17/42; G01S 17/87; G01S 17/48; G01S 7/4804; G01S 7/483;
(Continued)

(56) References Cited

U.S. PATENT DOCUMENTS 5,870,181 A   2/1999  Andressen
5,898,483 A   4/1999  Flowers
(Continued)

FOREIGN PATENT DOCUMENTS

CN   101010561   8/2007
CN   101813778   8/2010
(Continued)

OTHER PUBLICATIONS

European Patent Office Application Serial No. 14194878.6, Search Report dated Oct. 20, 2015, 13 pages.
(Continued)

*Primary Examiner* — Nikolay Yushin
(74) *Attorney, Agent, or Firm* — Lee, Hong, Degerman, Kang & Waimey

(57) ABSTRACT

A laser distance measuring device and a control method for the same are disclosed. More specifically, disclosed herein are a laser distance measuring device capable of quickly measuring horizontal and vertical distances using laser and a control method for the same. The laser distance measuring device may include a light transmitter, a light receiver, a sensing unit, and a controller configured to perform an control operation to emit split laser through the light transmitter, acquire time difference information indicating a difference between a time to emit the split laser and a time to sense, through the sensing unit, the split laser reflected from a target position, and calculate a distance to the target position using the time difference information.

15 Claims, 16 Drawing Sheets

(51) Int. Cl.
*G01S 17/42* (2006.01)
*G01S 17/48* (2006.01)
*G01S 17/87* (2006.01)
*G01S 7/48* (2006.01)
*G01S 7/497* (2006.01)

(52) U.S. Cl.
CPC ............... *G01S 17/42* (2013.01); *G01S 17/48* (2013.01); *G01S 17/87* (2013.01)

(58) Field of Classification Search
CPC ............ G01S 7/4808; G01C 3/06; G01C 3/08; G01C 3/00
See application file for complete search history.

(56) References Cited

U.S. PATENT DOCUMENTS

| | | | | |
|---|---|---|---|---|
| 6,057,909 | A * | 5/2000 | Yahav | G01C 11/025 |
| | | | | 313/103 CM |
| 6,671,037 | B2 | 12/2003 | Isogai et al. | |
| 6,970,297 | B2 * | 11/2005 | Huang | G02B 27/0012 |
| | | | | 359/642 |
| 7,535,554 | B2 * | 5/2009 | Oshima | G01B 11/16 |
| | | | | 356/141.1 |
| 7,859,655 | B2 * | 12/2010 | Troy | G01C 1/04 |
| | | | | 348/169 |
| 8,830,809 | B2 * | 9/2014 | Fujita | G11B 7/0917 |
| | | | | 369/103 |
| 9,106,807 | B2 * | 8/2015 | Gaglin | H04N 7/18 |
| 2003/0090647 | A1 | 5/2003 | Isogai et al. | |
| 2005/0013009 | A1 * | 1/2005 | Huang | G02B 27/0012 |
| | | | | 359/642 |
| 2008/0030710 | A1 * | 2/2008 | Oshima | G01B 11/16 |
| | | | | 356/4.01 |
| 2008/0186470 | A1 | 8/2008 | Hipp | |
| 2009/0086199 | A1 * | 4/2009 | Troy | G01C 1/04 |
| | | | | 356/251 |
| 2009/0147239 | A1 | 6/2009 | Zhu et al. | |
| 2013/0088872 | A1 | 4/2013 | Ball | |
| 2013/0215258 | A1 * | 8/2013 | Gaglin | H04N 7/18 |
| | | | | 348/87 |
| 2014/0064049 | A1 * | 3/2014 | Fujita | G11B 7/0917 |
| | | | | 369/47.49 |

FOREIGN PATENT DOCUMENTS

| | | |
|---|---|---|
| CN | 102043153 | 5/2011 |
| CN | 102759736 | 10/2012 |
| CN | 102971657 | 3/2013 |
| DE | 10-2004-042466 | 3/2006 |
| DE | 10-2007-003024 | 7/2008 |

OTHER PUBLICATIONS

The State Intellectual Property Office of the People's Republic of China Application Serial No. 201410795201.5 Office Action dated Nov. 10, 2016, 22 pages.
Zhu, et al., "Fusion of Time-of-Flight Depth and Stereo for High Accuracy Depth Maps," 2008 IEEE Conference on Computer Vision and Pattern Recognition, XP055130419, Jan. 2008, 8 pages.
European Patent Office Application Serial No. 14194878.6, Search Report dated May 26, 2015, 8 pages.
The State Intellectual Property Office of the People's Republic of China Application Serial No. 201410795201.5, Office Action dated Apr. 7, 2017, 31 pages.

* cited by examiner

DISTANCE MEASURING DEVICE AND METHOD THEREOF

Pursuant to 35 U.S.C. § 119(a), this application claims the benefit of earlier filing date and right of priority to Korean Patent Application Nos. 10-2013-0158205, filed on Dec. 18, 2013, and 10-2014-0000086, filed on Jan. 2, 2014, the contents of which are all hereby incorporated by reference herein in their entirety.

BACKGROUND OF THE INVENTION

Field of the Invention

The present invention relates to a distance measuring device and a method for the same.

Discussion of the Related Art

A distance measuring device of the present invention measures distance between the distance measuring device and an object around the distance measuring device using light. Methods of measuring distance using light include triangulation, time of flight (TOF), and a phase-shift-based method.

A laser distance measuring device may measure a distance from the position of the laser distance measuring device (hereinafter referred to as "measurement position") to the position of an object or a point subject to distance measurement (hereinafter referred to a "target position") using laser. A distance measurement method employing the laser distance measuring device measures distance based on time taken for the laser radiated from the laser distance measuring device to return to the laser distance measuring device after being reflected from the target position which the laser reaches. Such laser distance measuring device may be utilized not only to measure a distance between the measurement position and a specific point but also to measure a distance from the measurement position to a plurality of points in a specific line, plane, or space.

Recent methods of measuring a distance in three dimensions through the laser distance measuring device include 1) a distance measurement method using time taken for the laser to reach the laser distance measuring device after being reflected using a planar sensor 2) a method of measuring distance by refracting the laser with a lens. However, the method using the planar sensor has an angle limit for measurement. Accordingly, with this method, it may be difficult to measure distance in the horizontal range from 0 degree to 360 degrees and a lot of energy is needed to radiate the laser. In addition, the method of measuring distance by refracting the laser with a lens may slow distance measurement due to the mechanical characteristics of the lens that refracts the laser and causes errors. Accordingly, a method allowing quick and three-dimensional measurement of distance in the vertical/horizontal directions while suppressing the above disadvantages is required.

SUMMARY OF THE INVENTION

Accordingly, the present invention is directed to a distance measuring device and a method for the same that substantially obviate one or more problems due to limitations and disadvantages of the related art.

An object of the present invention is to provide a distance measuring device which may enhance accuracy of distance measurement using both triangulation and TOF, and a method for the same.

Another object of the present invention is to provide a laser distance measuring device to measure the distance of each of points arranged in the vertical direction using a specific laser and measure the distance by 360 degrees through a rotating structure and a method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a distance measuring device includes a light transmitter configured to emit a distance measuring beam onto an object, a light receiver configured to sense light reflected by the object and collected by the distance measuring device, a first distance calculator configured to calculate a value of a first distance between the distance measuring device and the object through the sensed light using a first measurement scheme, a second distance calculator configured to calculate a value of a second distance between the distance measuring device and the object through the sensed light using a second measurement scheme, and a controller configured to compare the value of the first distance and the value of the second distance with a reference distance, assign a weight according to a result of the comparison, and determine a final distance between the distance measuring device and the object.

In another aspect of the present invention, a distance measurement method for a distance measuring device includes emitting a distance measuring beam onto an object, sensing light reflected by the object and collected by the distance measuring device, calculating a value of a first distance between the distance measuring device and the object through the sensed light using a first measurement scheme, calculating a value of a second distance between the distance measuring device and the object through the sensed light using a second measurement scheme, comparing the value of the first distance and the value of the second distance with a reference distance, assigning a weight according to a result of the comparison, and determining a final distance between the distance measuring device and the object.

In another aspect of the present invention, a laser distance measuring device includes a light transmitter, a light receiver, a sensing unit, and a controller configured to perform an control operation to emit split laser through the light transmitter, acquire time difference information indicating a difference between a time to emit the split laser and a time to sense, through the sensing unit, the split laser reflected from a target position, and calculate a distance to the target position using the time difference information.

In a further aspect of the present invention, a laser distance measurement method including emitting line laser through a light transmitter, acquiring time difference information indicating a difference between a time to emit the line laser and a time to sense, through a sensing unit, the line laser reflected from a target position, and calculating a distance to the target position using the time difference information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. It will be easily appreciated by those skilled in the art that configurations according to the embodiments disclosed in this specification are applicable to various apparatuses. For example, these apparatuses include a robot to determine a path to follow by recognizing surrounding objects, an apparatus to sense fine movement around the apparatus and surrounding objects, an apparatus to inform the blind of obstacles, an apparatus to recognize movement of a user, and an apparatus to create a three-dimensional image.

Hereinafter, basic operations of a distance measurement method based on triangulation will be described with reference to FIG. 1.

Figure 1:
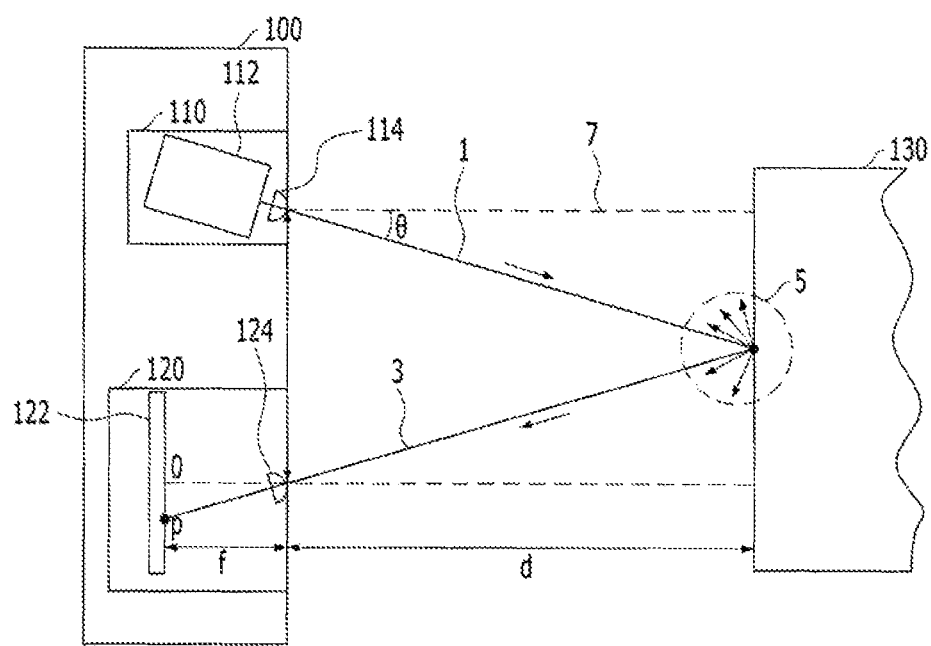
FIG. 1 illustrates basic operation of a distance measuring device using triangulation.

FIG. 1 is a block diagram illustrating basic operation of a distance measuring device using triangulation.

The distance measuring device 100 includes a light transmitter 110 and a light receiver 120.

Hereinafter, these constituents will be described in detail.

The light transmitter 110 may include a light source 112 configured to emit a distance measuring beam 1. The light transmitter 110 may further include a light source lens 114.

The light receiver 120 includes a light receiving lens 124 configured to concentrate the light 3, which is produced as the distance measuring beam 1 is reflected from a surrounding object 130, on a light receiving sensor 122. The light receiving sensor 122 senses the position on the light receiving sensor 122 where the returning light 3 is collected.

As shown in FIG. 1, the light transmitter 110 emits the distance measuring beam 1 toward the surrounding object 130. When the distance measuring beam 1 reaches the surrounding object 130, it is reflected from the surface T of the surrounding object in the form of light 5 which is directed in several directions. A part 3 of the light reflected in several direction by the light receiving lens 124 included in the distance measuring device 100 is collected at the light receiving sensor 122 of the light receiver 120.

The distance between the distance measuring device 100 and the surrounding object 130 is defined as d, the distance between the light source lens 114 and the light receiving lens 124 is defined as g, and the focal length of the light receiving lens 124 is defined as f. In addition, the angle by which the light source 112 is inclined with respect to a horizontal line 7 is defined as θ, and the position where the light is collected on the light receiving sensor 122 is defined as p. The value of position p of the light may be determined with the center of the light receiving sensor 122 set to "0". Once the values of f, g and θ are determined, the light receiving sensor 122 of the distance measuring device 100 may sense position p of the light and obtain the distance d between the distance measuring device 100 and the distance measurement position that satisfies Equation 1 given below.

$$d = \frac{-fg}{p - f\tan\theta} \qquad \text{Equation 1}$$

Figure 2:
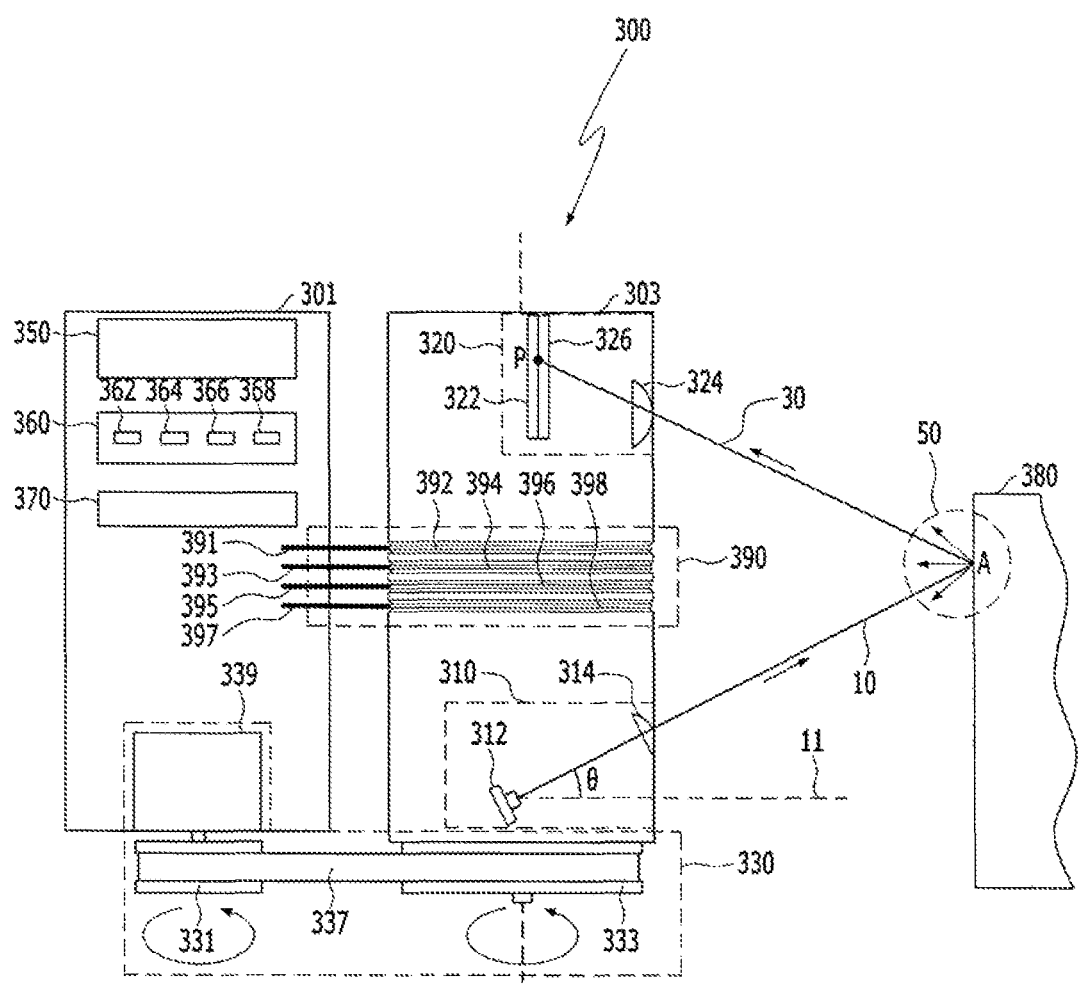
FIG. 2 is a block diagram illustrating basic operation of a distance measuring device according to one embodiment of the present invention.

FIG. 2 is a block diagram illustrating basic operation of a distance measuring device according to one embodiment of the present invention.

FIG. 2 shows an exemplary distance measuring device employing a distance measurement method based on triangulation illustrated in FIG. 1.

The distance measuring device 300 may include a light transmitter 310, a light receiver 320, a rotation drive unit 330, a communication unit 350, a controller 360, a power supply 370, and a power and communication connector 390.

The light transmitter 310 and the light receiver 320 may be fixed to a rotating substrate 303. The rotating substrate 303 rotates about a vertical line. While the light receiver 320 is illustrated as being fixed above the light transmitter 310 in FIG. 2, the light transmitter 310 may be fixed above the light receiver 320. The light transmitter 310 may include a light source 312 and a light source lens 314. The light source 312 may employ a light source such as a laser diode (LD) and a light emitting diode (LED) which are directional light sources. As the light source lens 314, a collimator lens may be used to change the light from the light source 312 to collimated light or convergent light.

The light receiver 320 may include a light receiving sensor 322, a light receiving lens 324, and a wavelength filter 326. The light receiving lens 324 concentrates light on the light receiving sensor 322, and the light receiving sensor 322 senses the position of the light concentrated by the light receiving lens 324. The wavelength filter 326 prevents light having a wavelength different from that of the light source 312 from being sensed by the light receiving sensor 322.

The rotation drive unit 330 causes the rotating substrate 303 to rotate about a vertical line. When the rotating substrate 303 rotates, the light transmitter 310 and the light receiver 320, which are fixed to the rotating substrate 303, also rotate together. As the light transmitter 310 and the light receiver 320 rotate, the measurement position is horizontally moved. The rotation drive unit 330 may be configured in various manners to rotate the rotating substrate 303. For example, the rotation drive unit 330 may rotate the rotating substrate 303 using a rotation drive motor 339, a first rotating pulley 331, a second rotating pulley 333, and a rotating belt 337.

A rotation controller 364 of the controller 360 controls the rotation drive motor 339 to rotate the rotation drive motor 339. When the rotation drive motor 339 rotates, the first rotating pulley 331 fixed to the rotation drive motor 339 also rotates. When the first rotating pulley 331 rotates, the rotating belt 337, to which the first rotating pulley 331 and the second rotating pulley 333 are fixed, rotates. As the rotating belt 337 rotates, the second rotating pulley 333 rotates. Since the second rotating pulley 333 is fixed to the rotating substrate 303, the rotating substrate 303 rotates when the second rotating pulley 333 rotates.

The communication unit 350, the controller 360 and the power supply 370 may be disposed on a main substrate 301. The controller 360 may include a distance calculator 362, a rotation controller 364, a space information computing unit 366, and a light transmission controller 368. The distance calculator 362 calculates the distance between the distance measuring device 300 and the measurement position based on a measurement signal containing the value of position p of the light transmitted from the light receiving sensor 322. The rotation controller 364 controls the rotation drive unit 330. The space information computing unit 366 creates space information data based on the distance calculated by the distance calculator 362 and a rotation angle sent from the rotation drive unit 330. For example, the rotation drive unit 330 may include an encoder. The encoder may transmit an encoder signal of an angle of the rotating substrate 303 corresponding to each distance measurement position to the space information computing unit 366. The light transmission controller 368 controls the light transmitter 310. Particularly, the light transmission controller 368 controls the light source 312 included in the light transmitter 310. In addition, the controller 360 controls overall operation of the distance measuring device 300. The controller 360 may transmit the space data created by the space information computing unit 366 to an external device through the communication unit 350 in a wired or wireless manner.

External power or internal power is applied to the power supply 370 according to control of the controller 360 to supply power necessary for operation of each constituent.

The power and communication connector 390 connects the main substrate 301 to the rotating substrate 303 to supply power to the rotating substrate 303 and allow control and measurement signals to be delivered between the main substrate 301 and the rotating substrate 303. In the example of FIG. 2, power is supplied to the rotating substrate 303 using a plurality of brushes 391, 393, 395 and 397 and rotating rings 392, 394, 396 and 398, control and measurement signals are delivered between the main substrate 301 and the rotating substrate 303. The brush and the rotating ring come in pairs. Detailed description will be given with reference to FIG. 5.

The constituents shown in FIG. 2 may not be essential, and thus the distance measuring device may have fewer or more constituents than in FIG. 2.

In FIG. 2, the distance between the distance measuring device 300 and a surrounding object 380 is measured using a distance measuring beam 10.

The light transmission controller 368 of the controller 360 transmits a control signal to the light transmitter 310 such that the light source 312 emits the distance measuring beam 10 to the surrounding object 380. Then, the distance measuring beam 10 reaches the surrounding object 380. When the distance measuring beam 10 reaches the surrounding object 380, it is reflected from the surface A of the surrounding object in the form 50 of light split into many parts. A part 30 of the light reflected and split into many parts by the light receiving lens 324 included in the distance measuring device 300 is collected on the light receiving sensor 322 of the light receiver 320. The light receiving sensor 322 transmits the value of position p of the light collected on the light receiving sensor 322 to the distance calculator 362 through a measurement signal. In order to sense the correct value of p, the wavelength filter 326 may be disposed between the light receiving lens 324 and the light receiving sensor 322. The wavelength filter 326 allows only light having the same wavelength as that of the light source 312 to be transmitted therethrough and prevents the other external light from being sensed by the light receiving sensor 322. The light receiving sensor 322 may transmit the value of p to the distance calculator 362 through a digital or analog measurement signal.

The distance calculator 362 of the controller 360 may obtain the distance between the surface A of the surrounding object and the distance measuring device 300 using Equation 1 described with reference to FIG. 1, based on the measurement signal containing the value of position p of the light received by the light receiving sensor 322.

As described above, the distance between the distance measuring device and the surrounding object may be calculated using TOF or phase-shift.

Referring back to FIG. 2, the distance measuring device 300 may measure the distance between the distance measuring device 300 and the surrounding object 380 using the distance measuring beam 10 in the TOF scheme as follows.

The light transmission controller 368 of the controller 360 transmits a control signal to the light transmitter 310 such that the light source 312 emits the distance measuring beam 10 onto the measurement position. Herein, the measurement position is the surface A of the surrounding object. The distance measuring beam 10 reaches the measurement position. When the distance measuring beam 10 reaches the measurement position, it is reflected from the measurement position in the form 50 of light split into many parts. A part 30 of the light reflected and spit into many parts by the light receiving lens 324 included in the distance measuring device 300 is collected by the light receiving sensor 322 of the light receiver 320.

In order to accurately sense the light 30, the wavelength filter 326 may be disposed between the light receiving lens 324 and the light receiving sensor 322. The wavelength filter 326 allows only light having the same wavelength as that of the light source 312 to be transmitted therethrough and prevents the other external light from being sensed by the light receiving sensor 322.

Using difference between the time at which the light source 312 emits the distance measuring beam 10 and the time at which the emitted light reflected from the measurement position is sensed by the light receiving sensor 322 of the distance measuring device 300, the distance calculator 362 may calculate the distance between the distance measuring device 300 and the surrounding object 380.

Specifically, when the light speed of the distance measuring beam 10 is c, and the difference between the time at which the distance measuring beam 10 is emitted and the time at which the emitted light reflected from the measurement position is sensed by the light receiving sensor 322 of the distance measuring device 300 is Td, the distance D between the distance measuring device 300 and the surrounding object 380 may be ½×c×Td.

Referring back to FIG. 2, the distance measuring device 300 may measure the distance between the distance measuring device 300 and the surrounding object 380 using the distance measuring beam 10 in the phase-shift scheme as follows.

The light transmission controller 368 of the controller 360 transmits a control signal having a certain frequency to the light transmitter 310 such that the light source 312 emits the distance measuring beam 10 onto the measurement position. Herein, the measurement position is the surface A of the surrounding object. Then, the distance measuring beam 10 reaches the surrounding object 380. When the distance measuring beam 10 reaches the surrounding object 380, it is reflected from the surface of the surrounding object in the form 50 of light split into many parts. A part 30 of the light reflected and spit into many parts by the light receiving lens 324 included in the distance measuring device 300 is collected on the light receiving sensor 322 of the light receiver 320.

The light receiving sensor 322 may generate a measurement signal using the sensed light 30, and the distance calculator 362 may estimate the phase-shift by comparing the control signal of a certain frequency which has been used when the distance measuring beam 10 is emitted onto the measurement position with the measurement signal generated using the light 30 which returns to the distance measuring device 300 after being reflected from the measurement position, and calculate the distance based on the estimated phase-shift.

Figure 3:
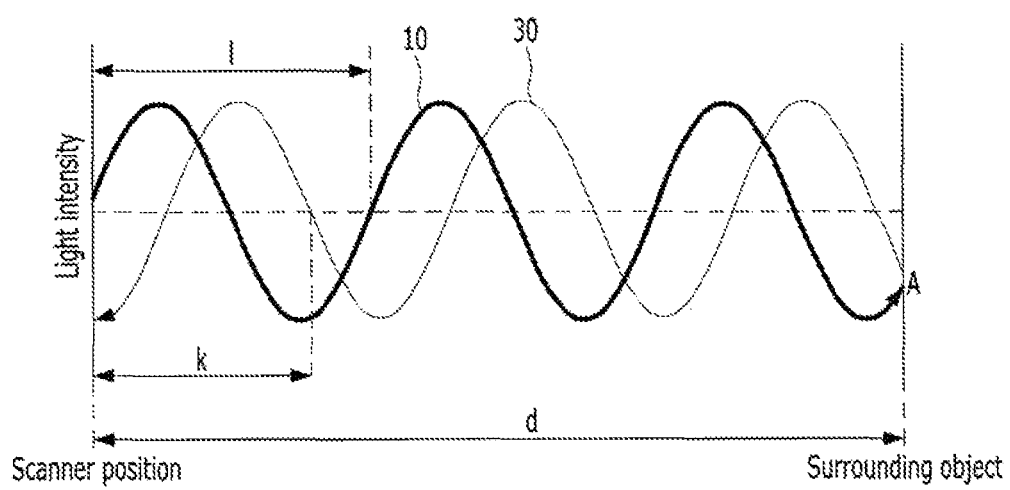
FIG. 3 depicts emission of a distance measuring beam with a certain frequency onto a measurement position by means of a control signal and return of the emitted distance measuring beam reflected from the measurement position to the distance measuring device.

FIG. 3 depicts emission of the distance measuring beam 10 onto the measurement position by the distance measuring device 300 according to a control signal having a certain frequency f. Herein, the measurement position is the surface A of the surrounding object. FIG. 3 also depict the light 30 returning to the distance measuring device 300 which is produced when the distance measuring beam 10 emitted according to the signal having the certain frequency is reflected from the measurement position. In FIG. 3, the distance between the distance measuring device 300 and the measurement position is d, the measured phase-shift between the distance measuring beam 10 and the returning reflected light 30 is k, and the wavelength of the distance measuring beam 10 and the returning reflected light 30 is l (=the speed of light c/frequency f of the control signal).

As described above, the distance calculator 362 may estimate the phase-shift by comparing the control signal of a certain frequency which has been used when the distance measuring beam 10 is emitted onto the measurement position with the light 30 which returns to the distance measuring device 300 after being reflected from the measurement position, and calculate the distance based on the estimated phase-shift.

As described above, the distance may be calculated in various ways. The space information computing unit 366 creates space information data based on the distance corresponding to each measurement position calculated by the distance calculator 362 and the rotation angle sent from the rotation drive unit 330. Since the rotating substrate 303 of the distance measuring device 300 rotates about a vertical line, the distance measuring device 300 may estimate the distance by moving from one distance measurement position to another. Relevant details are described below with reference to FIG. 4.

Figure 4:
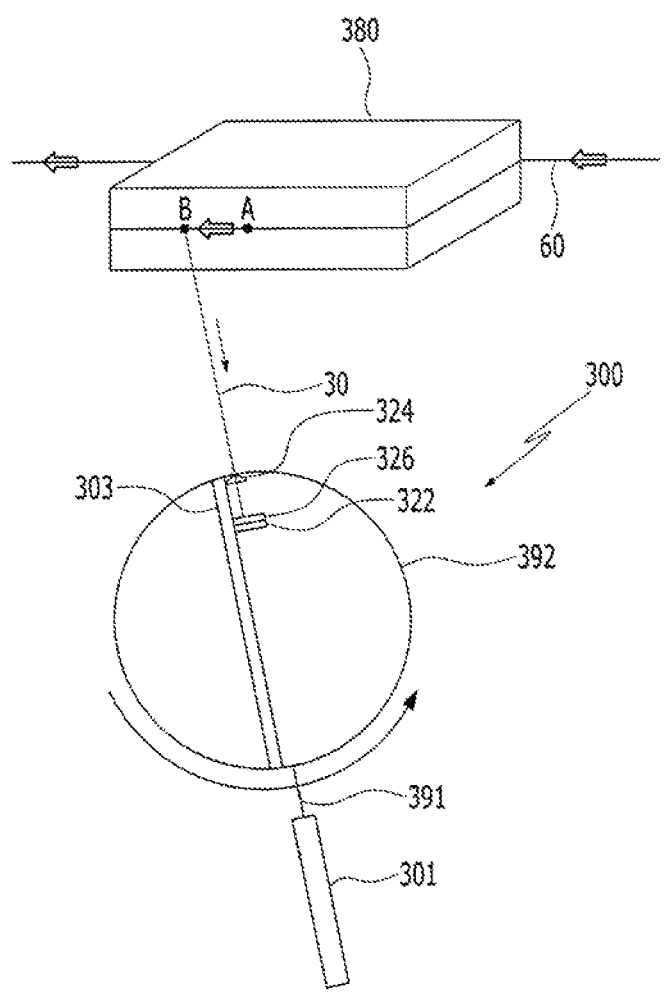
FIG. 4 is a view illustrating rotation of a rotating substrate by a certain angle as seen from the above.

FIG. 4 is a view illustrating rotation of the rotating substrate 303 about a vertical line by a certain angle, seen from the above. The rotation controller 364 of the controller 360 may drive the rotation drive unit 330 to rotate the rotating substrate 303 about a vertical line.

In FIG. 4, the distance between the distance measuring device 300 and the surrounding object 380 is measured as the distance measurement position placed on a first horizontal line 60 moves horizontally according to rotation of the rotating substrate 303.

In FIG. 4, the distance measuring device 300 measures the distance between the distance measuring device 300 and the measurement point A, and measures the distance between the distance measuring device 300 and the measurement point B according to rotation of the rotating substrate 300.

When the rotating substrate 303 rotates counterclockwise, measurement is implemented from right to left. When the rotating substrate 303 rotates clockwise, measurement is implemented from left to right. The distance measuring device 300 may measure the distance between the distance measuring device 300 and the surrounding object 380 every time the rotating substrate 303 rotates by a certain angle, as described with reference to FIG. 2.

Figure 5:
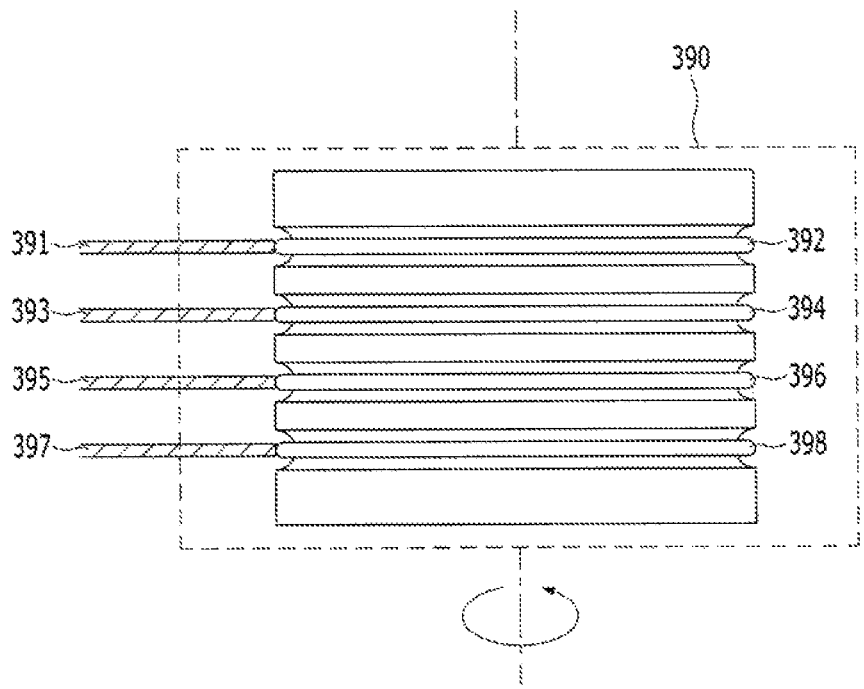
FIG. 5 is a view illustrating a power and communication connector in detail.

FIG. 5 is a view illustrating the power and communication connector 390 in detail. In the example of FIG. 5, power is supplied to the rotating substrate 303 using a plurality of brushes 391, 393, 395 and 397 and rotating rings 392, 394, 396 and 398, and control and measurement signals are delivered between the main substrate 301 and the rotating substrate 303.

The first brush 391, the second brush 393, the third brush 395 and the fourth brush 397 are directly or indirectly connected to the main substrate 301. The first rotating ring 392, the second rotating ring 394, the third rotating ring 396, and the fourth rotating ring 398 are fixed to the rotating substrate 303. The positions on the rotating substrate 303 where the rotating rings are fixed may depend on the positions of the brushes 391, 393, 395 and 397.

In FIG. 5, the first brush 391 and the second brush 393 contact the first rotating ring 392 and the second rotating ring 394 respectively to allow control and measurement signals to be delivered between the main substrate 301 and the rotating substrate 303. In this case, the first brush 391 and the first rotating ring 392 may be used to deliver a control signal sent from the main substrate 301 to the rotating substrate 303. For example, the light transmission controller 368 positioned on the main substrate 301 may transmit a control signal to the light source 312 positioned on the rotating substrate 303 through the first brush 391 and the first rotating ring 392.

In addition, the second brush 393 and the second rotating ring 394 may be used to deliver a measurement signal sent from the rotating substrate 303 to the main substrate 301. For example, a measurement signal generated based on the light sensed by the light receiving sensor 322 positioned on the rotating substrate 303 may be transmitted to the distance calculator 362 positioned on the main substrate 301 via the second rotating ring 394 and the second brush 393.

In the example of FIG. 5, the third brush 395 and the fourth brush 397 contact the third rotating ring 396 and the fourth rotating ring 398 respectively to supply power to the rotating substrate 303. In this case, the third brush 395 and the third rotating ring 396 may be used to supply power from the main substrate 301 to the rotating substrate 303. In addition, the fourth brush 397 and the fourth rotating ring 398 may be used to ground the rotating substrate 303.

Preferably, the rotating rings are spaced apart from each other. Preferably, the spaces between the rotating rings are filled with a non-conductive material.

In addition, the rotating ring may be positioned in guide grooves to allow each brush to contact only the corresponding rotating ring that makes a pair therewith.

Preferably, the brushes and the rotating rings are formed of a material that is very conductive. Particularly, the bushes are preferably formed of a material having high conductivity and high elasticity. In addition, it is preferable that the parts of the brush and the rotating ring which contact each other are not exposed to the outside so as to prevent dust and foreign substances from getting stuck between the brush and the rotating ring.

The power and communication connector 390 described above may be configured in various manners. For example, the number of brushes and rotating rings may be adjusted when necessary. In addition, the brushes and the rotating rings may be disposed between the light transmitter 310 and the light receiver 320, with respect to the upper end or lower end of the rotating substrate 303.

Figure 6:
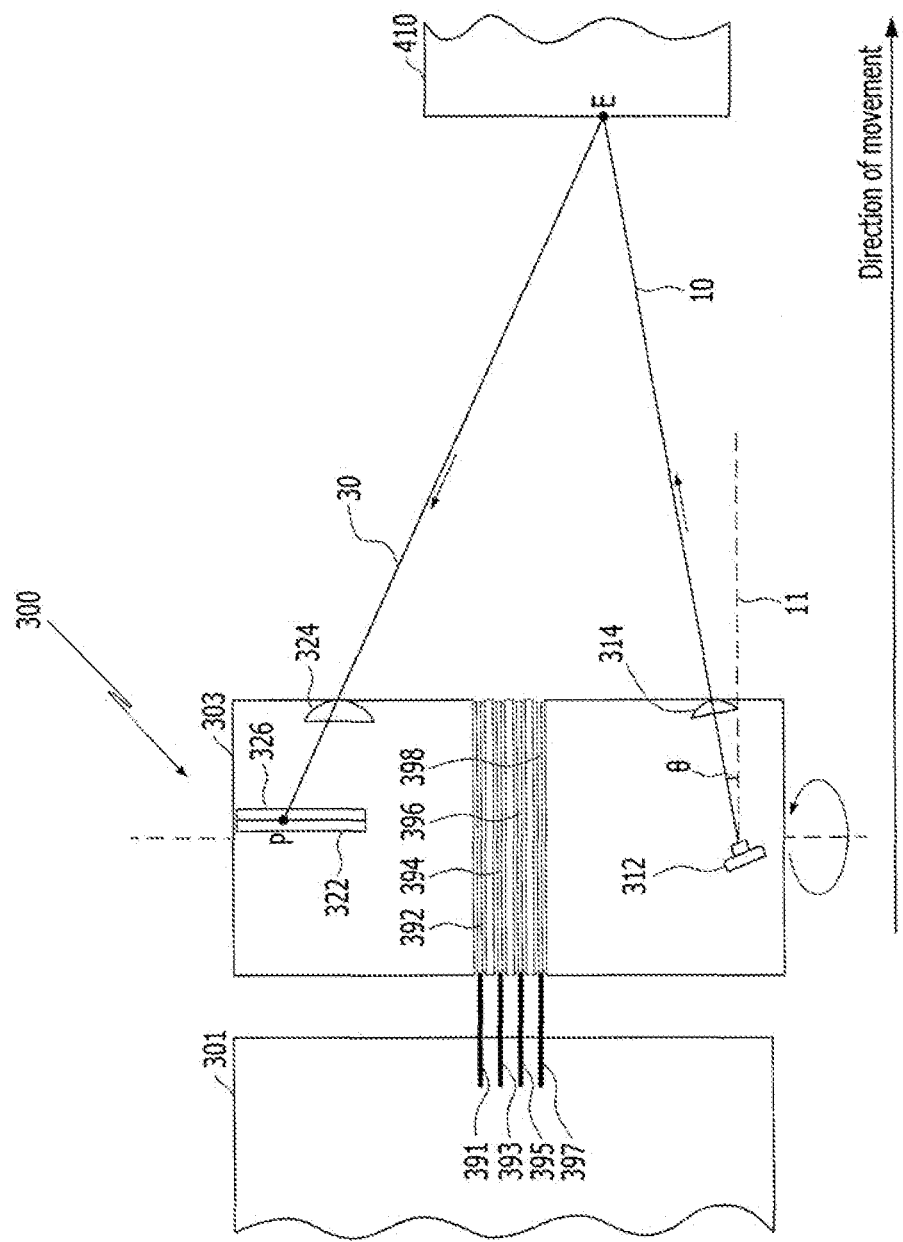
FIGS. 6 and 7 are views illustrating measurement of the distance between the distance measuring device and a surrounding object with the distance measuring device moving forward and the distance measurement position moving in the vertical direction.
Figure 7:
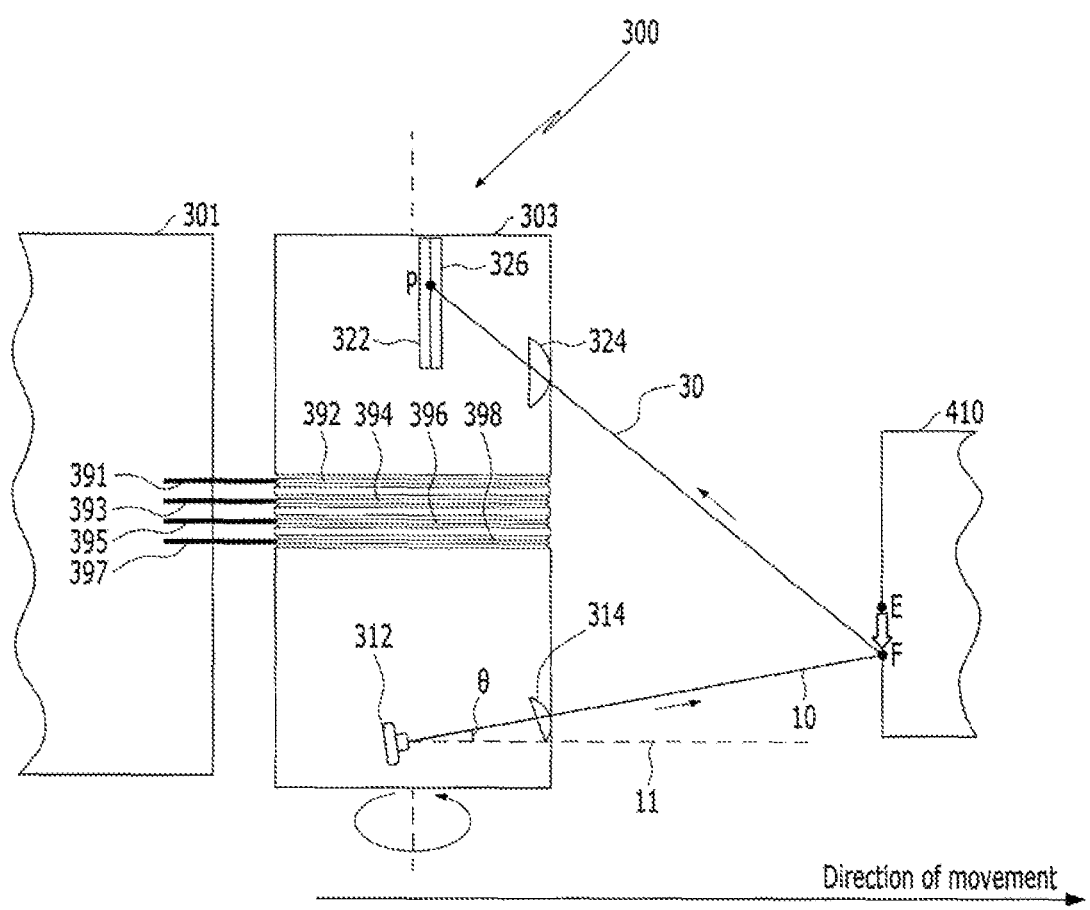

FIGS. 6 and 7 are views illustrating measurement of the distance between the distance measuring device and a surrounding object with the distance measuring device moving forward and the distance measurement position moving in the vertical direction.

In the example of FIG. 6, the distance measuring device 300 measures the distance between a surrounding object 410 and the distance measuring device 300. In this example, the measurement position is the surface E of the surrounding object 410.

In the example of FIG. 7, the distance between the surrounding object 410 and the distance measuring device 300 is measured as the distance measuring device 300 moves forward. In this example, the measurement position is the surface F of the surrounding object 410.

In FIGS. 6 and 7, the distance measurement position moves up and down as the distance measuring device 300 moves forward. In the illustrated examples, the distance measurement position moves from a distance measurement point E to a distance measurement point F. If the distance measuring device 300 moves rearward, on the other hand, the distance measurement position moves upward.

The light source 312 is configured such that the distance measuring beam 10 is emitted onto a surrounding object at a certain angle θ. Accordingly, the distance measuring device 300 may move back and forth to move the distance measurement position up and down to measure the distance to the surrounding object.

In addition, since the distance measuring beam 10 maintains a certain angle θ, the distance measuring device 300 can measure the distance between the distance measuring device 300 and a surrounding object having various heights by moving back and forth.

Preferably, the angle θ between the distance measuring beam 10 and the horizontal line 11 is an acute angle. The angle θ may depend on the distance between the light source 312 and the light receiving sensor 322.

Figure 8:
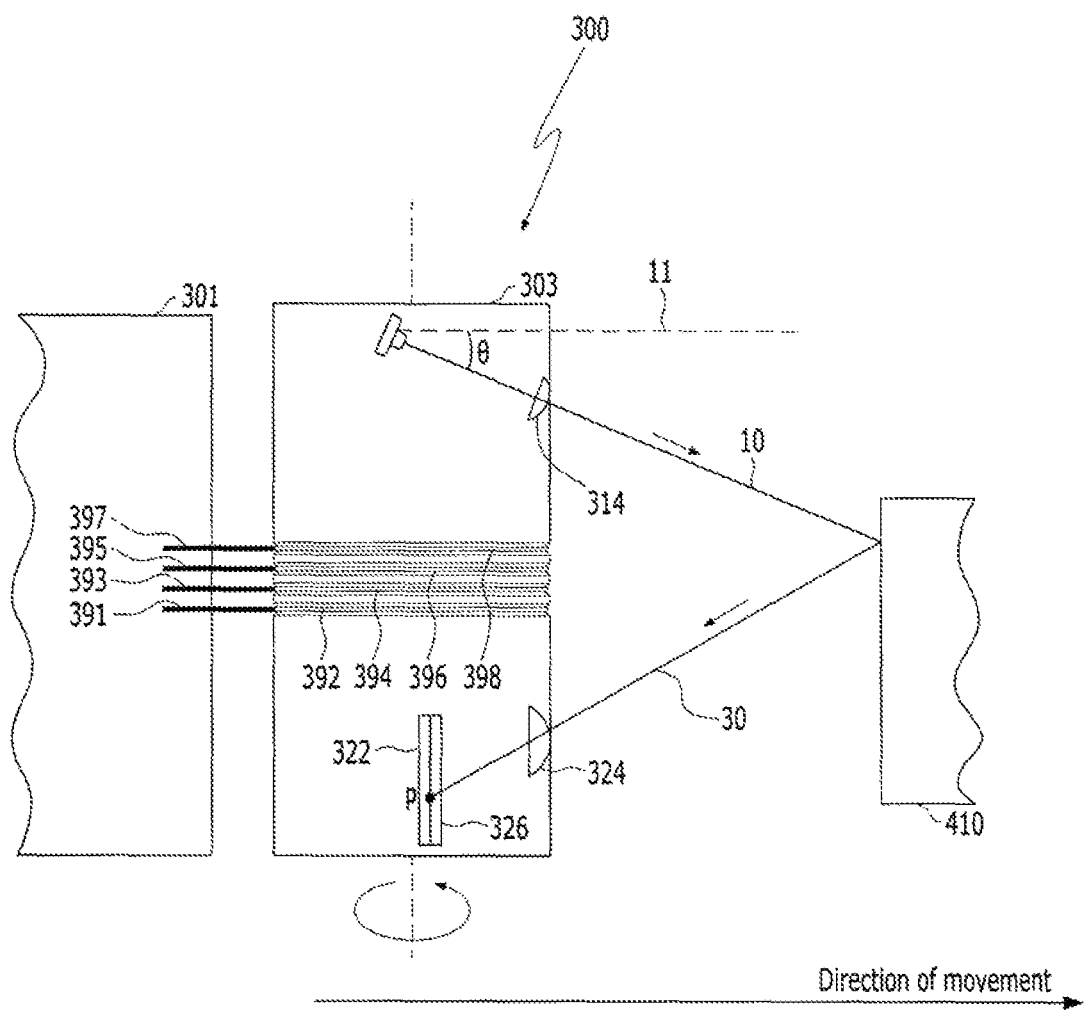
FIG. 8 illustrates configuring the distance measuring device by switching the vertical positions of a light transmitter and a light receiver.

FIG. 8 illustrates configuring the distance measuring device 300 by switching the positions of the light transmitter 310 and the light receiver 320. As shown in FIG. 7, the light transmitter 310 may be disposed above the light receiver 320. In this case, the distance measurement position moves upward when the distance measuring device 300 moves forward and the distance measurement position moves down when the distance measuring device 300 moves rearward.

Figure 9:
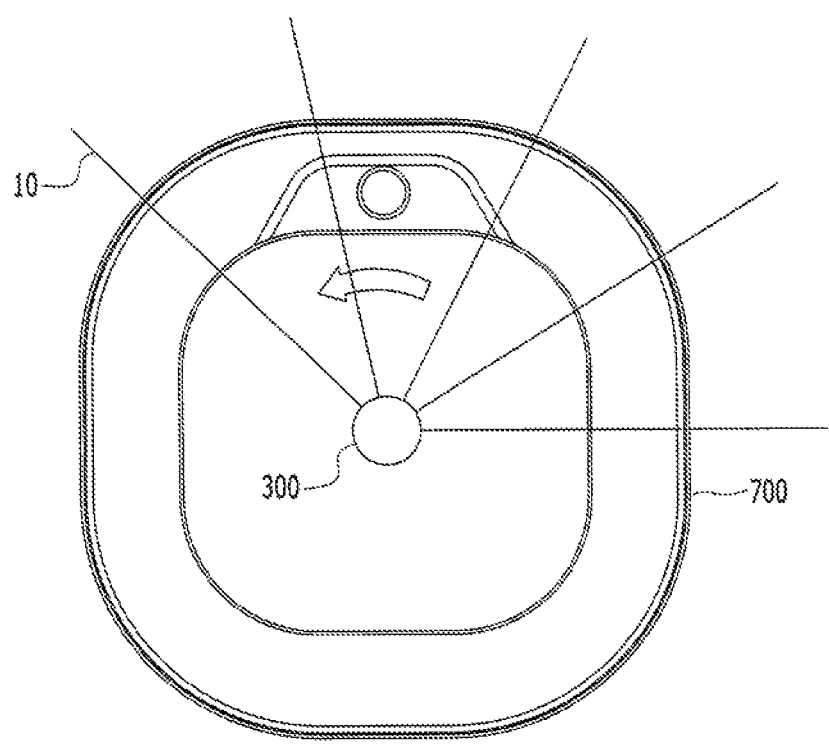
FIG. 9 is a view illustrating a robotic vacuum cleaner equipped with the distance measuring device.

FIG. 9 is a view illustrating a robotic vacuum cleaner 700 equipped with the distance measuring device 300. Once the distance between a surrounding object and the robotic cleaner is measured and the corresponding space data is transmitted to the robotic cleaner according to one embodiment of the present invention, the robotic cleaner determines movement thereof based on the received information.

Hereinafter, a description will be given of a distance measuring device and operation thereof according to one embodiment of the present invention with reference to FIGS. 10 and 11.

Figure 10:
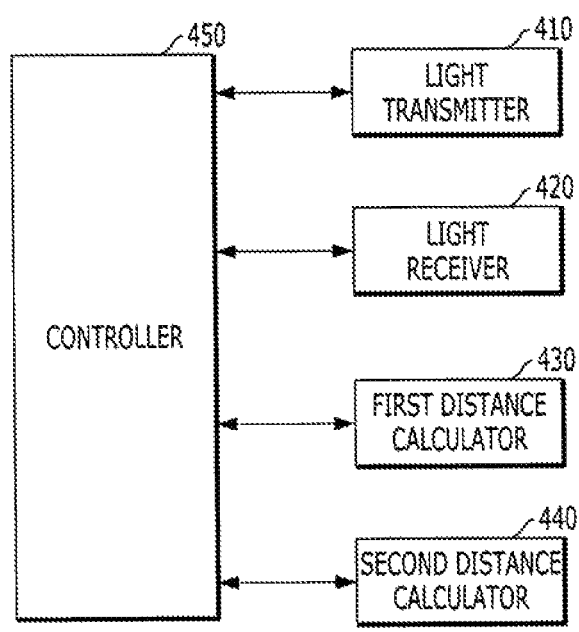
FIG. 10 is a block diagram illustrating a distance measuring device according to another embodiment of the present invention.

FIG. 10 is a block diagram illustrating a distance measuring device according to another embodiment of the present invention.

Hereinafter, the embodiment of FIG. 10 will be described with reference to the details illustrated in FIGS. 1 to 9.

Referring to FIG. 10, a distance measuring device 400 may include a light transmitter 410, a light receiver 420, a first distance calculator 430, a second distance calculator 440, and a controller 450.

The light transmitter 410 may emit a distance measuring beam onto an object spaced apart from the distance measuring device 400.

The light transmitter 410 may include a light source 112 configured to emit the distance measuring beam, a light source lens 114, and a diffraction device (not shown).

The light source 112 may emit the distance measuring beam, and include either an LED or an LD.

The light source lens 114 may cause the emitted distance measuring beam to be radiated in parallel with a horizontal line.

The diffraction device may split the distance measuring beam into a plurality of beams to be sent to the object. If the light transmitter 410 includes the diffraction device, it may not include the light source lens 114.

As the beams split by the diffraction device are incident on a light receiving sensor 122 included in the light receiver 420, the distance between the distance measuring device 400 and the object may be measured more precisely at various angles.

The light receiver 420 may include a light receiving lens 124 and a light receiving sensor 122.

The light receiving lens 124 causes the light reflected from the object to be concentrated on the light receiving sensor 122.

The light receiving sensor 122 may receive and sense the reflected light concentrated through the light receiving lens 124.

The first distance calculator 430 may calculate the value of a first distance between the distance measuring device 400 and the object through the received reflected light in a first measurement scheme.

The second distance calculator 440 may calculate the value of a second distance between the distance measuring device 400 and the object through the received reflected light in a second measurement scheme.

The controller 450 checks if the calculated values of the first distance the second distance are less than a reference distance. When the controller 450 confirms that the values of the first distance and the second distance are less than the reference distance, the controller 450 may apply a first weight to the value of the first distance, and calculate the distance between the distance measuring device 400 and the object based on the first weight as applied.

When the controller 450 confirms that the values of the first distance and the second distance are greater than the reference distance, the controller 450 may apply a weight to the value of the second distance, and calculate the distance between the distance measuring device 400 and the object based on the applied weight.

Hereinafter, operations of the elements constituting the distance measuring device 400 will be described in more detail with reference to FIG. 11.

Figure 11:
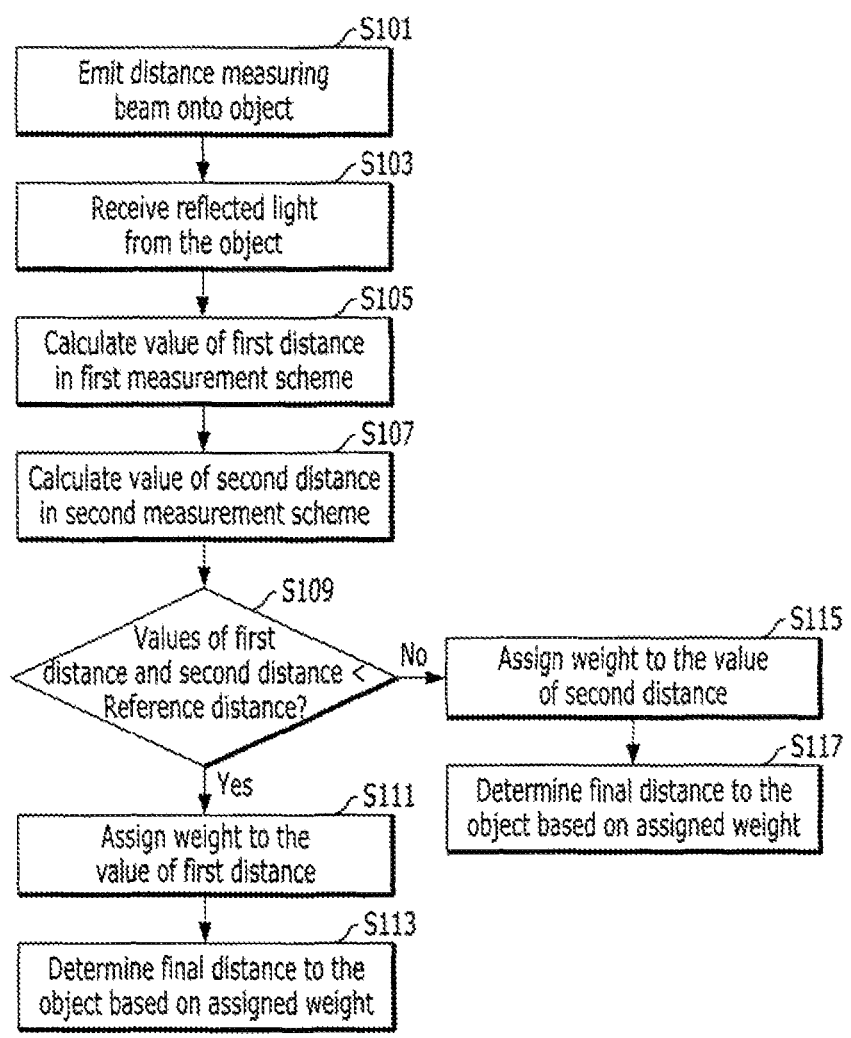
FIG. 11 is a flowchart illustrating operation of a distance measuring device according to one embodiment of the present invention.

FIG. 11 is a flowchart illustrating operation of a distance measuring device according to one embodiment of the present invention.

The light transmitter 410 of the distance measuring device 400 emits a distance measuring beam onto an object spaced apart from the distance measuring device 400 (S101).

The light receiver 420 of the distance measuring device 400 receives the reflected light which is produced when the distance measuring beam is reflected from the object (S103).

The first distance calculator of the distance measuring device 400 calculates the value of the first distance between the distance measuring device 400 and the object based on the received reflected light in a first measurement scheme (S105).

According to one embodiment, the first measurement scheme may be triangulation as illustrated in FIG. 1. As illustrated in FIG. 1, triangulation is a scheme of calculating the distance between the distance measuring device 400 and the object using the distance between a light source lens and a light receiving lens, the focal length of the light receiving lens, the angle between the light source and the horizontal line, and the position on the light receiving sensor at which the light is collected. According to this scheme, when the distance between the distance measuring device 400 and the object changes, the position on the light receiver 420 where the reflected light is collected changes. The distance measuring device 400 may calculate the distance between the distance measuring device 400 and the object by sensing the changed position.

The second distance calculator 440 of the distance measuring device 400 calculates the value of a second distance between the distance measuring device 400 and the object through the received reflected light in a second measurement scheme (S107).

According to one embodiment, the second measurement scheme may be time of flight (TOF) as illustrated in FIG. 2. As described above, TOF is a scheme of calculating the distance between the distance measuring device 400 and the object using difference between the time at which the distance measuring device 400 emits light and the time at which the emitted light returns to the distance measuring device 400 by being reflected from the object.

The controller 450 of the distance measuring device 400 checks if the calculated values of the first distance the second distance are less than a reference distance (S109).

According to one embodiment, the reference distance may be a distance that forms the basis for determining one of the distances calculated in the first measurement scheme and the second measurement scheme as the actual distance between the distance measuring device 400 and the object.

Distance resolution is an indicator that indicates how accurate the distance between the distance measuring device 400 and the object. The distance between the distance measuring device 400 and the object may depend on the distance resolution of each scheme.

The distance resolution of the triangulation scheme may depend on the distance between the distance measuring device 400 and the object. Specifically, the distance resolution of the triangulation scheme may increase as the distance between the distance measuring device 400 and the object decreases, and may decrease as the distance between the distance measuring device 400 and the object increases.

The distance resolution of the TOF scheme may be determined according to the speed of response of the light receiver 420, the speed of conversion from an analog signal to a digital signal, and the pulse width of a distance measuring beam. However, if a sufficient amount of light is incident on the light receiver 420, the distance resolution of the TOF scheme may be constant regardless of the distance between the distance measuring device 400 and the object.

If the distance between the distance measuring device 400 and the object is less than or equal to a certain distance, the triangulation scheme may have a higher distance resolution than the TOF scheme and thus be more accurate.

On the other hand, if the distance between the distance measuring device 400 and the object is greater than or equal to a certain distance, the triangulation scheme may have a lower distance resolution than the TOF scheme, and thus distance measurement in the triangulation scheme may be more inaccurate than in the TOF scheme.

According to one embodiment of the present invention, a reference distance may be set, and the measured distance may be compared with the reference distance to determine a distance measurement scheme which provides more accurate distance measurement.

When it is confirmed that the values of the first distance and the second distance are less than the reference distance, the controller 450 assigns a first weight to the value of the first distance (S111), and calculates the final distance between the distance measuring device 400 and the object based on the first weight as assigned (S113).

That is, if both the value of the first distance calculated in the first measurement scheme and the value of the second distance calculated in the second measurement scheme are less than the reference distance, the controller 450 may determine that the value of the first distance calculated in the first measurement scheme is more accurate than the value of the second distance calculated in the second measurement scheme.

The controller 450 may calculate the distance between the distance measuring device 400 and the object by multiplying the value of the first distance calculated in the first measurement scheme by the weight.

For example, when the distance between the distance measuring device 400 and the object is d, the first distance acquired in the first measurement scheme is x1, the second distance acquired in the second measurement scheme is x2, and the weight is y, the distance between the distance measuring device 400 and the object may be calculated by the equation d=(y×x1+x2)/2.

According to one embodiment, the weight y may be 1.2. However, this value is simply illustrative, and the weight may depend on the difference between the first distance and the reference distance. For example, increase in the difference between the value of the first distance and the reference distance means that the value of the first distance decreases. This in turn means that the distance value measured in the triangulation scheme decreases. Accordingly, the weight y may be set to a greater value. This is because the resolution of the triangulation scheme becomes high as the measured distance value decreases.

In contrast, decrease in the difference between the value of the first distance and the reference distance means that the value of the first distance increases. This in turn means that the distance value measured in the triangulation scheme increases. Accordingly, the weight y may be set to a smaller value. This is because the resolution of the triangulation scheme becomes low as the measured distance value increases.

According to another embodiment, the controller 450 may calculate the distance between the distance measuring device 400 and the object by applying a weight to each of the value of the first distance calculated in the first measurement scheme and the value of the second distance calculated in the second measurement scheme.

That is, the controller 450 may multiply the value of the first distance calculated in the first measurement scheme by a first weight and apply a second weight to the value of the second distance calculated in the second measurement scheme, thereby calculating the distance between the distance measuring device 400 and the object. Herein, the first weight may be greater than the second weight.

For example, when the distance between the distance measuring device 400 and the object is d, the first distance acquired in the first measurement scheme is x1, the second distance acquired in the second measurement scheme is x2, the first weight is y1, and the second weight is y2, the distance between the distance measuring device 400 and the object may be calculated in the equation d=(y1×x1+y2×x2)/2. Herein, the first weight y1 may be set to a value greater than y2. The value of y1 may be 1.2, and the value of y2 may be 0.8. However, embodiments of the present invention are not limited thereto. The values of y1 and y2 may depend on the difference between the value of the first distance and the reference distance. For example, increase in the difference between the value of the first distance and the reference distance means that the value of the first distance decreases. This in turn means that the distance value measured in the triangulation scheme decreases. Accordingly, y1 may be set to a value greater than 1.2, y2 may be set to a value less than 0.8. This is because the resolution of the triangulation scheme becomes high as the measured distance value decreases.

In contrast, decrease in the difference between the value of the first distance and the reference distance means that the value of the first distance increases. This in turn means that the distance value measured in the triangulation scheme increases. Accordingly, y1 may be set to a value greater than 1 and less than 1.2, and y2 may be set to a value less than 1 and greater than 0.8. This is because the resolution of the triangulation scheme becomes low as the measured distance value increases.

When it is confirmed that the values of the first distance and the second distance are greater than the reference distance, the controller 450 assigns a weight to the value of the second distance (S115), and calculates the final distance between the distance measuring device 400 and the object based on the assigned weight (S117).

That is, if both the value of the first distance calculated in the first measurement scheme and the value of the second distance calculated in the second measurement scheme are greater than the reference distance, the controller 450 may determine that the value of the second distance calculated in the second measurement scheme is more accurate than the value of the first distance calculated in the first measurement scheme.

The controller 450 may calculate the distance between the distance measuring device 400 and the object by multiplying the value of the second distance calculated in the second measurement scheme by the weight.

For example, when the distance between the distance measuring device 400 and the object is d, the first distance acquired in the first measurement scheme is x1, the second distance acquired in the second measurement scheme is x2, and the weight is y, the distance between the distance measuring device 400 and the object may be calculated by the equation d=(x1+y×x2)/2.

According to one embodiment, the weight y may be 1.2. However, this value is simply illustrative, and the weight may depend on the difference between the first distance and the reference distance. For example, increase in the difference between the value of the first distance and the reference distance means that the value of the first distance decreases. This in turn means that the distance value measured in the triangulation scheme decreases. Accordingly, the weight y may be set to a smaller value. This is because the resolution of the triangulation scheme becomes high as the measured distance value decreases.

In contrast, decrease in the difference between the value of the first distance and the reference distance means that the value of the first distance increases. This in turn means that the distance value measured in the triangulation scheme increases. Accordingly, the weight y may be set to a greater value. This is because the resolution of the triangulation scheme becomes low as the measured distance value increases.

According to another embodiment, the controller 450 may calculate the distance between the distance measuring device 400 and the object by applying a weight to each of the value of the first distance calculated in the first measurement scheme and the value of the second distance calculated in the second measurement scheme.

That is, the controller 450 may multiply the value of the first distance calculated in the first measurement scheme by a first weight and apply a second weight to the value of the second distance calculated in the second measurement scheme, thereby calculating the distance between the distance measuring device 400 and the object. Herein, the first weight may be less than the second weight.

For example, when the distance between the distance measuring device 400 and the object is d, the first distance acquired in the first measurement scheme is x1, the second distance acquired in the second measurement scheme is x2, the first weight is y1, and the second weight is y2, the distance between the distance measuring device 400 and the object may be calculated by the equation d=(y1×x1+y2×x2)/2. Herein, the first weight y1 may be set to a value less than y2. The value of y1 may be 0.8, and the value of y2 may be 1.2. However, embodiments of the present invention are not limited thereto. The values of y1 and y2 may depend on the difference between the value of the first distance and the reference distance. For example, increase in the difference between the value of the first distance and the reference distance means that the value of the first distance decreases. This in turn means that the distance value measured in the triangulation scheme decreases. Accordingly, y1 may be set to a value less than 1 and greater than 0.8, y2 may be set to a value greater than 1 and less than 1.2. This is because the resolution of the triangulation scheme becomes high as the measured distance value decreases.

In contrast, decrease in the difference between the value of the first distance and the reference distance means that the value of the first distance increases. This in turn means that the distance value measured in the triangulation scheme increases. Accordingly, y1 may be set to a value less than 1 and less than 0.8, and y2 may be set to a value greater than 1 and less than 1.2. This is because the resolution of the triangulation scheme becomes low as the measured distance value increases.

While the embodiments of FIGS. 1 to 11 described above assume that different measurement schemes are adopted, another embodiment of FIGS. 12 to 16 described below assumes that one measurement scheme is adopted. Of course, a combination of the embodiments illustrated in FIGS. 1 to 11 and the embodiment illustrated in FIGS. 12 to 16 is also within the scope of the present invention.

Figure 12:
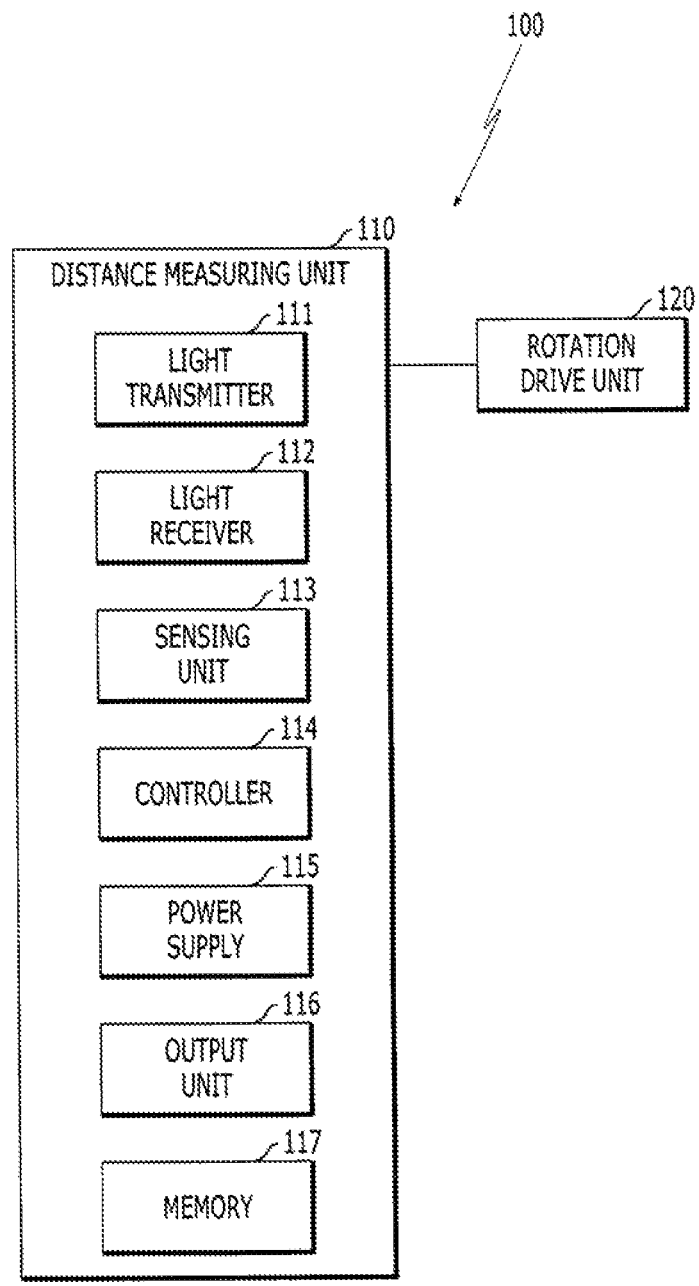
FIG. 12 is a block diagram illustrating a laser distance measuring device according to another embodiment of the present invention.

FIG. 12 is a block diagram illustrating a laser distance measuring device according to another embodiment of the present invention.

A laser the distance measuring device 100 may include a distance measuring unit 110 and a rotation drive unit 120. The distance measuring unit 110 may include a light transmitter 111, a light receiver 112, a sensing unit 113, a controller 114, a power supply 115, and an output unit 116. The constituents shown in FIG. 12 may not be essential, and thus the laser distance measuring device 100 may have fewer or more constituents than in FIG. 12.

Hereinafter, the aforementioned constituents will be described one by one.

The distance measuring unit 110 may radiate a laser onto a target position and collect the laser reflected from the target position, thereby measuring a distance using difference between the radiation time and the sensing time. The distance measuring unit 110 may include the light transmitter 111, the light receiver 112, the sensing unit 113, the controller 114, the power supply 115, and the output unit 116.

The light transmitter 111 may emit laser onto the target position to measure a distance. Specifically, the light transmitter 111 may emit not only typical laser that is radiated onto a point along a line in a specific direction but also line laser radiated in the form of a straight line in the direction perpendicular to the ground and split laser radiated onto a plurality of points along straight lines perpendicular to the ground. A user may make a selection so as to cause one of the aforementioned types of laser to be radiated by the light transmitter 111. In addition, the time at which laser is emitted through the light transmitter 111 may be stored in a memory 117 as a radiation time, and may be used to calculate a distance. A method for measuring the distance to a target position using line laser and split laser will be described with reference to FIGS. 15 and 16 later.

The light receiver 112 may concentrate the laser reflected from the target position toward the sensing unit 113. Since the laser emitted from the light transmitter 111 is reflected in several directions at the target position, the intensity of the reflected laser is lower than that of the laser emitted from the light transmitter 111. If the intensity of the laser is low, it is not easy for the sensing unit 113 to sense the laser. Accordingly, the light receiver 112 may concentrate the laser to allow the sensing unit 113 to easily sense the reflected laser.

The sensing unit 113 may sense the laser collected by the light receiver 112. The time at which the laser is sensed by the sensing unit 113 may be stored in the memory 117 as a sensing time, and may be used to calculate a distance.

The controller 114 usually controls overall operation of the laser distance measuring device. For example, the controller 114 implements control and processing related to laser output, calculation of time difference, rotation of the distance measuring unit, and the like.

In addition, the controller 114 may adjust the output intensity of the emitted laser. The output intensity of laser may affect the distance measurement. If the radiated laser is excessively strong, the output of the reflected laser also becomes strong. This may be favorable to distance measurement, but may damage the target position or expose the user to danger. On the other hand, if the emitted laser is excessively weak, the output of the reflected laser also becomes weak. This may make distance measurement impossible. Accordingly, the user needs to properly adjust the output intensity of the laser according to the environment for distance measurement. The user may implement accurate distance measurement by adjusting the output intensity of the laser through the controller 114.

In addition, the controller 114 may adjust the output duration during which the laser is emitted. The output duration of the laser may also affect the distance measurement. As the output duration of the laser increases, the error in distance measurement may be minimized. Accordingly, the user may implement accurate distance measurement by adjusting the output duration through the controller 114.

External power and internal power are applied to the power supply 115 according to control of the controller 114. Thereby, the power supply 115 supplies power necessary for operations of the respective constituents. The power supply 115 may include, for example, a battery, a connection port, a power supply controller, and a charge monitor. The battery may be a built-in battery that is rechargeable and detachably coupled to the body of a terminal to be charged.

The output unit 116, which is configured to generate visual, audible or tactile outputs may include a display, an acoustic output module, an alarm unit, and a haptic module.

The memory 117 may store programs for processing and control of the controller 114, temporarily store input/output data. The frequency of use of the data may be stored in the memory 117. The memory 117 may include at least one type of storage media such as a flash memory, a hard disk, a multimedia card micro, a card-type memory (e.g., a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

An interface (not shown) functions as a path between the laser distance measuring device 100 and all devices connected thereto. The interface receives data transmitted from an external device, or receives supplied power and delivers the same to each constituent in the laser distance measuring device, or allows data in the laser distance measuring device to be delivered to the external device.

The rotation drive unit 120 may horizontally rotate the distance measuring unit 110 by 360 degrees. Accordingly, it is possible for the rotation drive unit 120 to implement distance measurement for a space in any direction.

The embodiments of the present invention described above may be implemented in a recording medium that is readable through a computer or the like using, for example, software, hardware, or a combination thereof.

When implemented by hardware, an embodiment of the present invention described in this specification may be embodied using as at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units for performing relevant functions. In some cases, the embodiments described in this specification may be implemented by the controller 150.

When implemented by software, embodiments of the present invention such as procedures and functions described in this specification may be implemented by separate software modules. Each of the software modules may perform at least one function and operation described in this specification. Software code may be implemented through a software application that is written in an appropriate programming language. The software code may be stored in the memory 117 and executed by the controller 114.

The present invention proposes a laser distance measuring device capable of quickly measuring a distance with respect to a vertical space within a horizontal range from 0 degrees to 360 degrees and within a certain vertical angle by rotating the distance measuring unit for emission of linear laser or split laser having the form of multiple branches through the rotation drive unit, and a method. Hereinafter, the structure of the laser distance measuring device 100 and a method for measuring a distance using the laser distance measuring device 100 will be described with reference to FIG. 13.

Figure 13:
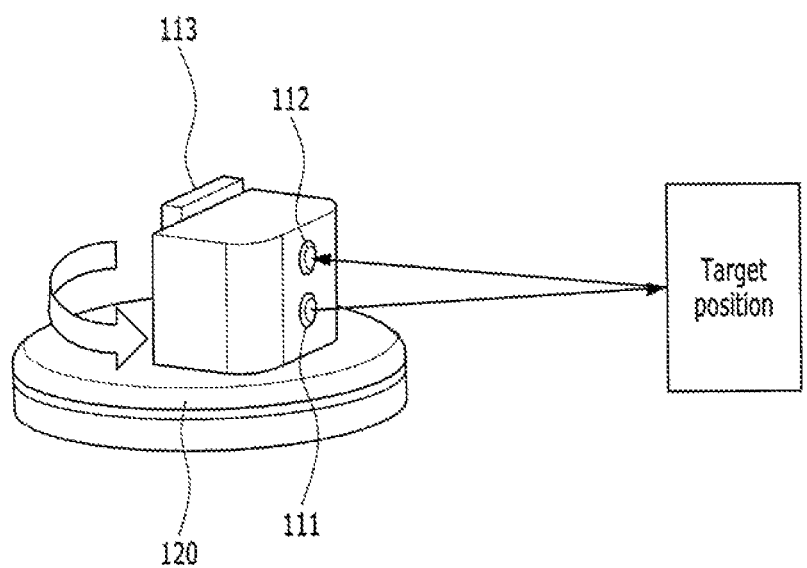
FIG. 13 is a view illustrating a laser distance measuring device and measurement of the distance to a target position with the laser distance measuring device according to another embodiment of the present invention.

FIG. 13 is a view illustrating a laser distance measuring device and measurement of the distance to a target position with the laser distance measuring device according to another embodiment of the present invention.

For example, as shown in FIG. 13, the controller 114 may acquire information about the radiation time while laser is radiated by the light transmitter 111. In addition, when the radiated laser is reflected from a target position and collected by the light receiver 112, and the collected laser is sensed by the sensing unit 113, information about the sensing time may be acquired and then information about time difference between the radiation time and the sensing time may be acquired. Using the acquired information about the time difference, the distance between the measurement position where the laser the distance measuring device 100 is disposed and the target position may be calculated in Equation 1 given below.

$$D = \frac{1}{2} * C * Td \qquad \text{Equation 1}$$

In Equation 1, D denotes the distance between the measurement position and the target position, C denotes the speed of light, and Td denotes the time difference between the radiation time and the sensing time.

Hereinafter, a description will be given of an embodiment of measurement of the distance to the target position by means of the laser distance measuring device proposed in the present invention, with reference to FIG. 14.

Figure 14:
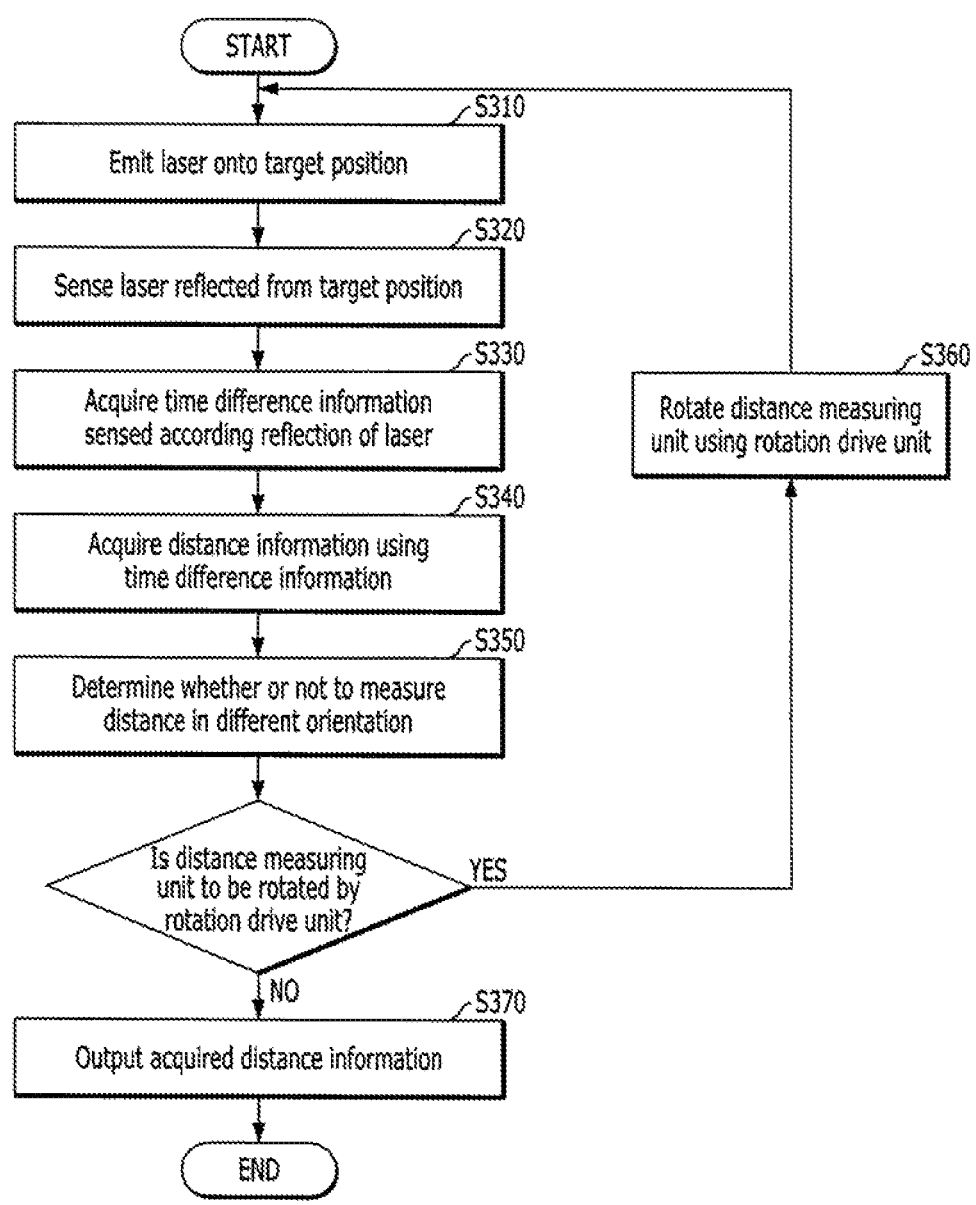
FIG. 14 is a flowchart illustrating measurement of the distance to a target position with a laser distance measuring device according to another embodiment of the present invention.

FIG. 14 is a flowchart illustrating measurement of the distance to a target position with a laser distance measuring device according to another embodiment of the present invention.

The controller 114 may control the light transmitter 111 such that the light transmitter 111 emits laser onto a first target position (S310). The laser emitted from the light transmitter 111 may take the form of a straight line, line laser, or laser split through a grating technique. The laser in the form of line laser and split laser will be described with reference to FIGS. 15 and 16.

The controller 114 may perform the control operation such that the laser reflected from the first target position is concentrated through the light receiver 112, and the concentrated laser is sensed by the sensing unit 113 (S320). The intensity of the laser reflected from the first target position may be much lower than that of the laser emitted from the light transmitter 111. Accordingly, the light receiver 112 may concentrate the reflected laser at the position of the sensing unit 113 to facilitate sensing of the laser.

The controller 114 may acquire information about time difference between the radiation time at which laser is radiated and the sensing time at which the sensing unit 113 senses the reflected laser (S330).

Using the information about the time difference, the controller 114 may acquire information about the distance between the first target position and the measurement position as described above with reference to in FIG. 13 (S340). The acquired distance information may be provided for the user by the output unit 116.

In order to acquire the distance information about a second target position in addition to the distance information about the first target position, the controller 114 may determine whether or not to rotate the distance measuring unit using the rotation drive unit (S350).

When determination is made such that the distance information about the second target position is acquired, the controller 114 may control the rotation drive unit 120 such that the distance measuring unit 110 points to the second target position (S360). Then, the distance measuring unit 110 may acquire the information about the distance between the measurement position and the second target position through the steps from S310 to S340.

When it is determined that there is no additional target position to acquire distance information about, the controller 114 may output the acquired distance information through the output unit 116 (S370). The distance information may be output through visual effect provided by a display or auditory effect provided by an acoustic output module.

Hereinafter, a laser distance measuring device according to types of laser and a measurement method thereof will be described with reference to FIGS. 15 and 16.

Figure 15:
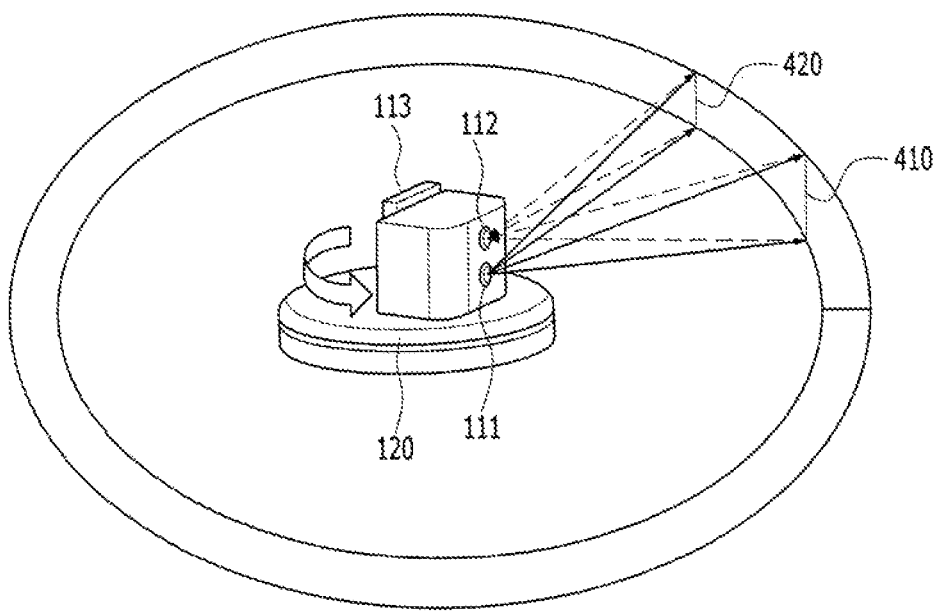
FIG. 15 is a view illustrating a laser distance measuring device employing line laser according to another embodiment of the present invention.

FIG. 15 is a view illustrating a laser distance measuring device employing line laser according to another embodiment of the present invention.

A laser distance measuring device employing line laser may emit line laser through the light transmitter 111. Herein, the line laser may represent laser vertically emitted by a certain length in the form of a straight line. The method of emitting the line laser may include a method of refracting the laser emitted onto a point using a lens such that the refracted laser takes the form of a straight line having a certain length and a method of emitting line laser in the form of a straight line having a certain length through a plurality of laser beams. For example, in order to emit line laser at 10 degrees as shown in FIG. 15, the controller 114 may emit line laser beams in the form of straight lines from 64 points onto a target position. In addition, the controller 114 may set the length and position of the line laser through the light transmitter 111. Further, as the radiation time increases, accuracy is enhanced. Accordingly, the controller 114 may control the time of radiation of the line laser such that the time corresponds to a desired accuracy.

For example, the emitted line laser may reach the first target position 410, from which the laser is reflected. Then, the controller 114 may control the reflected line laser such that the reflected line laser is sensed by the sensing unit 113 through the light receiver 112. The time difference between the radiation time and the sensing time may vary with the point within the line laser. The distance information about the respective points within the line laser may be acquired using the radiation time and the sensing time as described above with reference to FIG. 2. The information about the vertical distance of the first target position may be acquired through the distance information about the respective points. When information about the vertical distance of the second target position 420 needs to be acquired, the controller 114 may acquire information about the vertical distance of the second target position 420 by controlling the rotation drive unit 120 such that the light transmitter 111 points to the second target position 420 as in the process of acquiring the distance information about the first target position 410.

With the line laser, distances to the respective vertical points with respect to a specific target position may be simultaneously measured. Accordingly, a mechanism for refraction of laser is eliminated, and thus three-dimensional distance information may be quickly measured structurally and stably.

Figure 16:
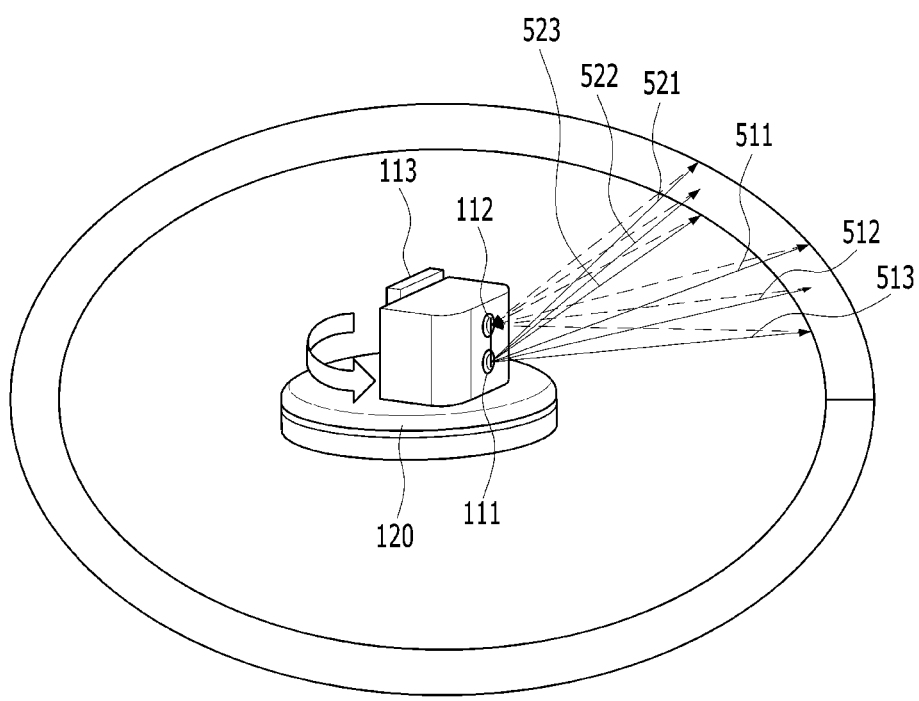
FIG. 16 is a view illustrating a laser distance measuring device employing split laser according to another embodiment of the present invention.

FIG. 16 is a view illustrating a laser distance measuring device employing split laser according to another embodiment of the present invention.

A laser distance measuring device employing split laser may emit split laser through the light transmitter 111. Herein, the split laser may represent laser which is split into at least two emitted branches spaced a predetermined distance from each other. The method of emitting split laser may include a method of refracting laser emitted onto a point using a lens to emit a plurality of laser branches and a method of emitting the split laser through a plurality of laser beams. The controller 114 may set the number of laser beams split from the laser, positions of the split branches, and the space between the split branches through the light receiver 112. As the radiation time increases, accuracy is enhanced. Accordingly, the controller 114 may control the time of radiation of the split laser such that the time corresponds to a desired accuracy.

For example, split laser emitted by being split into three branches may reach the upper end 511, middle end 512 and lower end 513 of a third target position and then be reflected therefrom as shown in FIG. 16. Then, the controller 114 may control the reflected split laser such that the reflected split laser is sensed by the sensing unit 113 through the light receiver 112. In addition, the distance information about the upper end 511, middle end 512 and lower end 513 of the third target position may be acquired as in the example of FIG. 13 described above. When distance information about the upper end 521, middle end 522 and lower end 523 of a fourth target position needs to be acquired, the controller 114 may acquire the distance information about the fourth target position (521, 522, 523) by controlling the rotation drive unit 120 such that the light transmitter 111 points to the fourth target position (521, 522, 523), as in the process of acquiring the distance information about the third target position (511, 512, 513).

When a split laser is used to measure a three-dimensional distance, the laser may be emitted with a higher intensity. Accordingly, the distance to a faraway object or point may be measured, and error of distance measurement may be reduced.

As is apparent from the above description, the present invention has effects as follows.

According to embodiments of the present invention, accuracy of distance measurement may be significantly enhanced using triangulation and TOF.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A distance measuring device comprising:
 a light transmitter configured to emit one of a first distance measuring beam and a second distance measuring beam selectively onto an object;
 a light receiver configured to sense light reflected by the object and collected by the distance measuring device;
 a rotating substrate configured to rotate about a vertical line, wherein the light transmitter and the light receiver are fixed to the rotating substrate such that the light transmitter and the light receiver rotate together when the rotating substrate rotates about the vertical line;
 a first distance calculator configured to calculate a value of a first distance between the distance measuring device and the object through the sensed light using a first measurement scheme when the first distance measuring beam is emitted from the light transmitter;
 a second distance calculator configured to calculate a value of a second distance between the distance measuring device and the object through the sensed light using a second measurement scheme when the second distance measuring beam is emitted from the light transmitter;
 a controller configured to:
  cause the light transmitter to emit the first distance measuring beam by transmitting a first control signal to the light transmitter;
  cause the light transmitter to emit the second distance measuring beam by transmitting a second control signal to the light transmitter, the first control signal and the second control signal having different frequencies;
  compare the value of the first distance and the value of the second distance with a reference distance;
  assign a weight according to a result of the comparison; and
  determine a final distance between the distance measuring device and the object; and
 a main substrate on which the controller, the first distance calculator, and the second distance calculator are disposed.

2. The distance measuring device according to claim 1, wherein, when both the value of the first distance and the value of the second distance are greater than the reference distance, the controller determines the final distance by assigning the weight to the value of the second distance.

3. The distance measuring device according to claim 1, wherein the controller determines the final distance by assigning weights to both the value of the first distance and the value of the second distance.

4. The distance measuring device according to claim 1, wherein the first measurement scheme is triangulation, and the second measurement scheme is Time of Flight (TOF).

5. The distance measuring device according to claim 1, wherein the main substrate and the rotating substrate are connected by a power and communication connector.

6. The distance measuring device according to claim 5, wherein power is supplied to the rotating substrate via the power and communication connector.

7. The distance measuring device according to claim 1, wherein, when both the value of the first distance and the value of the second distance are less than the reference distance, the controller determines the final distance by assigning the weight to the value of the first distance.

8. The distance measuring device according to claim 7, wherein the weight is differently set according to a difference between the reference distance and the value of the first distance.

9. The distance measuring device according to claim 8, wherein the controller assigns the weight set to a smaller value as the difference between the reference distance and the value of the first distance becomes small, and
assigns the weight set to a larger value as the difference between the reference distance and the value of the first distance becomes large.

10. A distance measurement method for a distance measuring device, comprising:
emitting, by a light transmitter, one of a first distance measuring beam and a second distance measuring beam selectively onto an object;
sensing, by a light receiver, light reflected by the object and collected by the distance measuring device, wherein the light transmitter and the light receiver are fixed to a rotating substrate configured to rotate about a vertical line such that the light transmitter and the light receiver rotate together when the rotating substrate rotates about the vertical line;
calculating, by a first distance calculator, a value of a first distance between the distance measuring device and the object through the sensed light using a first measurement scheme when the first distance measuring beam is emitted from the light transmitter;
calculating, by a second distance calculator, a value of a second distance between the distance measuring device and the object through the sensed light using a second measurement scheme when the second distance measuring beam is emitted from the light transmitter;
comparing, by a controller, the value of the first distance and the value of the second distance with a reference distance, assigning a weight according to a result of the comparison, and determining a final distance between the distance measuring device and the object,
wherein the first distance measuring beam is emitted by the light transmitter when a first control signal is received by the light transmitter from the controller,
wherein the second distance measuring beam is emitted by the light transmitter when a second control signal is received by the light transmitter from the controller,
wherein the first control signal and the second control signal have different frequencies, and
wherein the controller, the first distance calculator, and the second distance calculator are disposed on a main substrate.

11. The distance measurement method according to claim 10, wherein the determining of the final distance comprises:
determining the final distance by assigning the weight to the value of the first distance when both the value of the first distance and the value of the second distance are less than the reference distance.

12. The distance measurement method according to claim 10, wherein the determining of the final distance comprises:
determining the final distance by assigning the weight to the value of the second distance when both the value of the first distance and the value of the second distance are greater than the reference distance.

13. The distance measurement method according to claim 10, wherein the assigning and determining comprises:
assigning weights to both the value of the first distance and the value of the second distance and determining the final distance.

14. The distance measurement method according to claim 10, wherein the weight is differently set according to a difference between the reference distance and the value of the first distance.

15. The distance measurement method according to claim 14, wherein the assigning and determining comprises:
assigning the weight set to a smaller value as the difference between the reference distance and the value of the first distance becomes small; and
assigning the weight set to a lager value as the difference between the reference distance and the value of the first distance becomes large.

* * * * *